Patented Dec. 11, 1945

2,390,518

UNITED STATES PATENT OFFICE 2,390,518

TRIMETHYLETHOXYSILICANE AND ITS PREPARATION

William Herbert Daudt, Corning, N. Y., assignor to Corning Glass Works, Corning, N. Y., a corporation of New York No Drawing. Application September 1, 1943, Serial No. 500,855

2 Claims. (Cl. 260—462)

This invention relates to compositions of matter and their preparation and, more particularly, to organo-silicon compounds and their preparation.

The primary object of the present invention is to prepare a new composition of matter consisting of trimethylethoxysilicane. Other objects will become apparent from the following description.

I have discovered that trimethylethoxysilicane may be prepared in good yields by the following method. Dimethyldiethoxysilicane which had been carefully purified by column distillation to remove all traces of alcohol and hydrolysis products was added to a reaction vessel containing magnesium turnings in equimolecular quantity and a volume of ethyl ether, approximately equal to that of dimethyldiethoxysilicane. The volume of ether employed is not critical. Through this mixture was bubbled at room temperature methyl chloride gas until most of the magnesium had dissolved. The reaction was carried out under anhydrous conditions. When the reaction product was fractionally distilled, no tetramethylsilicane (B. P. 26° C.) was observed, for the ether came over first at its boiling point (33° C.). The temperature next rose rapidly to 75° C. and trimethylethoxysilicon, $(CH_3)_3SiOC_2H_5$, B. P. 75°–76° C. was obtained in 73% yield. The character of the product was established by analysis to be the desired compound.

It is advisable in carrying out the above process that the starting material, dimethyldiethoxysilicane, be free of ethyl alcohol and that moisture be excluded during the process so that alcohol will not be formed by hydrolysis of the silicane. It has also been found that trimethylethoxysilicane forms an azeotropic mixture with ethyl alcohol in approximately the proportions by weight of 70-30 respectively. Such an azeotrope may be extracted with water to remove the alcohol with very little loss of trimethylethoxysilicane by hydrolysis. Trimethylethoxysilicane also forms a binary azeotrope with benzene and a ternary azeotrope with ethyl alcohol and benzene. I have also found that trimethylethoxysilicane is produced in small yields by the action of methyl chloride and magnesium on ethyl orthosilicate and/or methyltriethoxysilicane. However, by far the greater proportion of the product consists of dimethyldiethoxysilicane.

Trimethylethoxysilicane or one of its azetropes has been found to be extremely valuable as an intermediate in the production of organo-silicon oxide copolymers, particularly methylsilicon oxide copolymers. These copolymers may be prepared by hydrolyzing mixtures of two or more hydrolyzable organo-silicanes followed by co-condensation of the hydrolysis products. It has been found that the presence of tri-organo-substituted units in the copolymers greatly stabilizes them against further polymerization. The methyl silicon oxide copolymers, which consist of the structural units

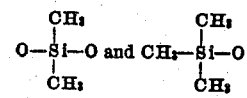

are particularly valuable products because they are extremely stable liquids which exhibit very low viscosity change with temperature, and are suitable for hydraulic mechanisms, damping apparatus, etc. Trimethylethoxysilicane possesses the desirable property of hydrolyzing and condensing very slowly in the presence of water so that when mixed with dimethyldiethoxysilicane and water added, inter-condensation of the two can take place to form the above polymer rather than intra-condensation of the trimethylethoxysilicane to the compound trimethylsilicon oxide $[(CH_3)_3Si]_2O$. It has also been found that in using trimethylethoxysilicane to form the above methylsilicon oxide copolymer, the product has a lower viscosity and even greater stability than the hydrolysis product of dimethyldiethoxysilicane alone. The larger the amount of trimethylethoxysilicane added the lower the viscosity of the resulting copolymer. Thus a method of controlling the viscosity of the liquids for particular applications as hydraulic fluids, damping fluids, etc., is provided.

What is claimed is:

1. The method of making trimethylethoxy silicane which comprises reacting methyl chloride with magnesium and dimethyldiethoxy silicane in ethyl ether, fractionally distilling the reaction product and recovering therefrom trimethylethoxy silicane.

2. The method which comprises mixing dimethyldiethoxy silicane and magnesium in approximately equimolecular proportions in ethyl ether, passing methyl chloride gas through the mixture under substantially anhydrous conditions until substantially all of the magnesium is dissolved, fractionally distilling the reaction product, and recovering trimethylethoxy silicane boiling at approximately 75 to 76° C.

WILLIAM HERBERT DAUDT.